United States Patent Office 3,199,101
Patented Aug. 3, 1965

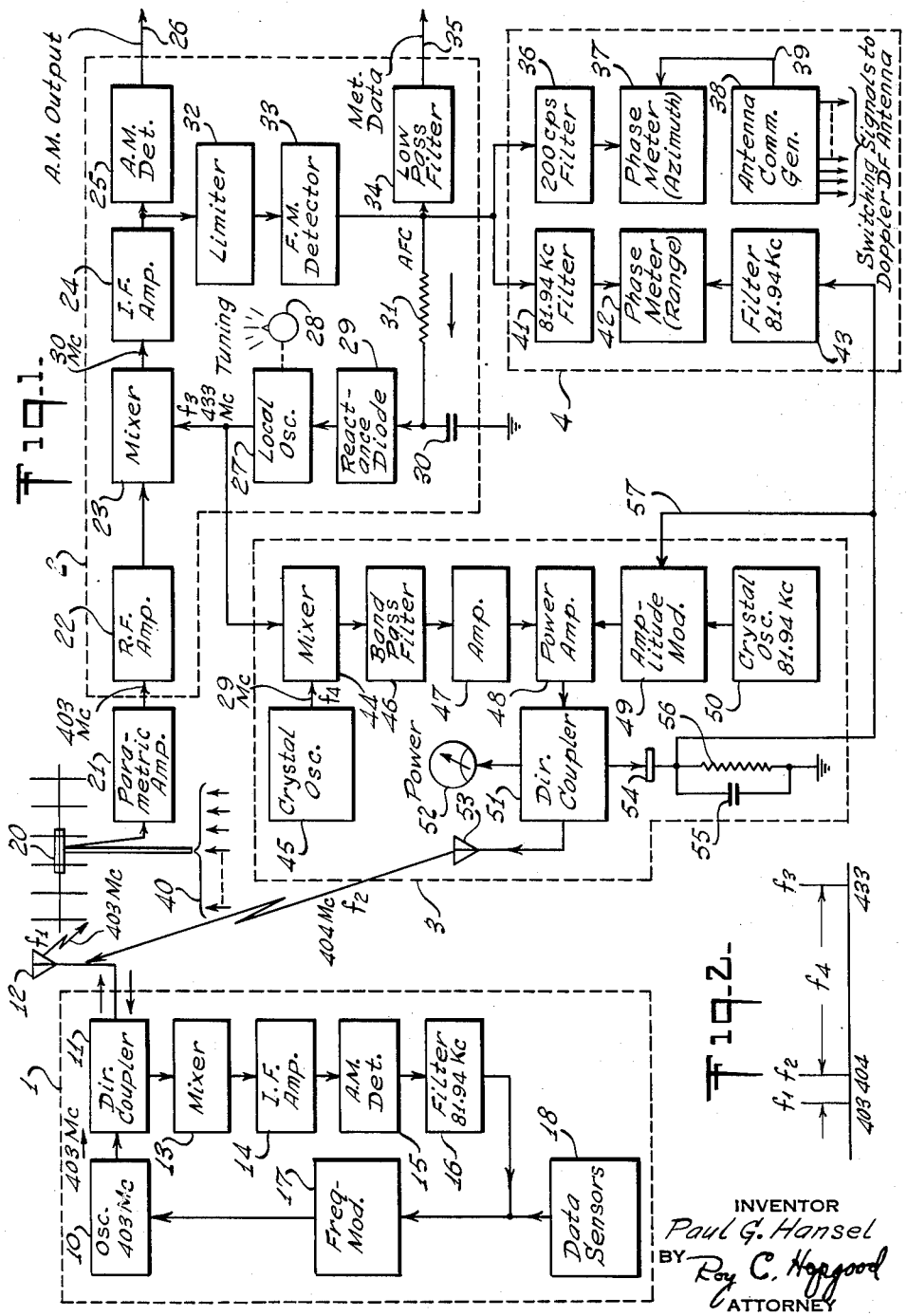

3,199,101
RADIOSONDE AND TRACKING SYSTEM
Paul G. Hansel, Greenvale, N.Y., assignor to Servo Corporation of America, Hicksville, N.Y., a corporation of New York
Filed Sept. 16, 1960, Ser. No. 56,598
7 Claims. (Cl. 343—7.6)

This invention relates to a radiosonde and tracking system and, more specifically, to an arrangement for azimuth and range tracking of the radiosonde.

Conventional radiosonde systems employ equipment having separate and distinct transmitting and receiving units operating at separate frequencies in conjunction with a tracking station. These arrangements have presented severe operating problems. For example, the radiosonde transmitter is usually a simple oscillator and, therefore, is subject to frequency drift over wide limits. Similarly, the radiosonde receiver also drifts over wide limits. As a result, the tracking equipment is costly and complicated, since it must sense the frequency transmitted by the radiosonde and the actual frequency to which the radiosonde receiver is tuned. Generally, this is accomplished by frequency sweeping the ranging transmitter at the tracking station to sense the midpoint of the radiosonde receiver reception band. Thereafter, the frequency of transmission at the tracking station is controlled through elaborate instrumentation.

Accordingly, it is an object of the invention to provide a system, including an economical and expendable radiosonde, which accurately and automatically provides azimuth and range information for a tracking station.

It is another object of the invention to provide an arrangement at a tracking station for automatically tuning a ranging transmitter to the response frequency of a radiosonde receiver.

Another object is to provide a Doppler direction finding arrangement at a tracking station for receiving radiosonde signals which can be phase compared with reference signals after demodulation to provide indications of range and azimuth.

A more specific object of the invention is to provide an arrangement in a tracking station transmitter for controlling the distortion level of ranging modulation.

In accordance with an aspect of the invention, there is provided a tracking station for transmitting a signal modulated carrier wave to a radiosonde receiver. The modulated signal is detected at the receiver, and the demodulated envelope is used to modulate a source of radiosonde carrier waves. The radiosonde, of course, contains equipment for collecting meteorological data and this information is also modulated on the carrier waves. The waves are then retransmitted back to the tracking station where they are received and detected to provide the meteorological information, and information indicative of the range and azimuth of the radiosonde.

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 is a block diagram of the radiosonde and tracking system; and

FIG. 2 is a diagram showing the frequency relationships of the signals of the system.

Referring now to FIG. 1, the novel system generally comprises a radiosonde 1 carried aloft by a balloon or other means, and a tracking station which may be an airborne, ground, or shipboard station. The tracking station comprises a receiver 2, a transmitter 3, and comparator means 4 for determining the range and azimuth of the radiosonde 1.

The tracking station transmitter 3 comprises an arrangement, including a crystal oscillator 45 and a mixer 44, for generating a carrier wave having a frequency $f_2$. The specific means for generating this carrier wave with a particular frequency will be described more fully hereinafter. The particular frequency value $f_2$ is designated as being 404 megacycles (mc.), for purposes of illustration, and it is to be understood that this frequency and others that are designated, have been chosen only by way of example.

The output of the mixer 44 is filtered by a band pass filter 46 to pass the 404 mc. carrier wave which is amplified at 47 and applied to a power amplifier 48. The amplifier 48 constitutes the power amplification stage of the transmitter 3. Range finding modulation is imposed on the carrier wave by generating a signal, for example 81.94 kilocycles (kc.), in a crystal oscillator 50, and utilizing this signal for amplitude modulating the carrier wave $f_2$ at 49.

A directional coupler 51 applies the output energy of amplifier 48 to antenna 53; the power level, which may be in the general range of 10 to 100 watts, is indicated on a meter 52 connected to the directional coupler. The major portion of power output from the amplifier 48 is transmitted by the antenna 53, however a portion is "leaked" to a simple amplitude modulation detector 54. The detector 54 recovers the modulation envelope, which is filtered by R-C filter 55 and 56, and applied as inverse feedback over the line 57 to the modulator 49 to reduce inherent phase distortion and to control the degree or depth of the modulation.

The radiosonde 1, which generally includes a source of carrier waves indicated as an oscillator 10, metering data sensors and blocking oscillator 18 and signal receiving means, is provided with an antenna 12 which receives the modulated carrier waves transmitted by antenna 53. The received signal is coupled to a crystal diode mixer 13 through a simple directional coupler 11. The directional coupler permits the signals received by the antenna 12 to pass with minimum attenuation to the mixer 13.

The oscillator 10 generates local oscillations having a frequency $f_1$, which is indicated as being 403 mc. The generated waves are modulated as will be explained hereinafter and are coupled through the directional coupler 11 for transmission by antenna 12. However, during reception of the tracking station signal, a portion of the local oscillations is "leaked" through coupler 11 to the mixer. The tracking station transmitted carrier wave, having a frequency of 404 mc., and the local oscillations, having a frequency of 403 mc. are heterodyned in the mixer 13 to provide a difference or intermediate frequency of one mc. The mixer 13 delivers the I-F signal to a tuned amplifier 14. When the frequency of oscillator 10 is equal to the assumed value of 403 mc., the superheterodyning receiving arrangement is responsive to 404 mc. to produce an I-F of one mc.

The amplified signal is coupled to a crystal diode amplitude modulation detector 15 where the signal is demodulated. The demodulated signal having a frequency of 81.94 kc. is filtered at 16 and the demodulation envelope is applied to frequency modulator 17 for modulation of the local oscillations. A conventional meteorological data sensor and blocking oscillator unit 18 operates according to conventional practice and delivers a sequence of pulses, e.g., having a pulse repetition rate proportional to a parameter that is being sensed, to the modulator 17 for a second modulation of the local oscillator 10. The unit 18 may also include a scanning switch driven by a timing motor to select the data sensors (assuming a plurality are used) in an appropriate sequence.

The modulated radiosonde carrier waves are then coupled through directional coupler 11 to an antenna 12 for retransmission to the tracking station.

The tracking station is provided with a direction finder, which in the embodiment shown, is an omnidirectional quasi-Doppler type multi-element antenna 20. The antenna 20 is electronically commutated to the receiver by antenna commutation generator 38 which electronically connects the antenna elements in succession to the receiver. The direction finding antenna arrangement provides the azimuth bearing and range of the radiosonde.

A parametric amplifier 21 is mounted in close proximity to the antenna 20, preferably in the central hub to provide maximum sensitivity, since the radiosonde utilizes low power and the distances between the radiosonde and the tracking station are substantial. The output of amplifier 21 is fed to a conventional receiver 2. The receiver 2 comprises a radio frequency amplifier 22, a mixer 23, a local oscillator 27, an intermediate frequency amplifier 24, an amplitude modulation detector 25, a limiter 32 and a frequency modulation detector 33.

The receiver 2 is roughly tuned by a tuning control 28 to the frequency $f_1$ (403 mc.) of the carrier waves produced by the oscillator 10. The frequency of the local oscillator 27 is controlled by a conventional automatic frequency control circuit, including filter elements 30–31 and a reactance diode 29. The local oscillator provides a signal having a frequency equal to the sum of an intermediate frequency of 30 megacycles and the actual frequency of the radiosonde oscillator which is coupled to the mixer 23. The frequency $f_3$ of the local oscillator output, therefore, is 433 megacycles if the frequency of the carrier waves produced by oscillator 10 is assumed at 403 mc.

If the radiosonde meteorological information is amplitude modulated this component of the detected signal would be provided at the output 26 of the detector 25. In the illustrated embodiment, however, the radiosonde data is frequency modulated on the carrier, and after detection at 33 is passed by filter 34 for display or recording.

The detector 33 is coupled to a filter 36 which passes energy having a frequency of 200 cycles per second, a frequency equal to the scanning or commutation rate of the Doppler antenna 20. The filter output is applied to a phase meter 37 which is also supplied with a reference signal over line 39 from the antenna commutation generator 38. The reference signal corresponds to the Doppler rotation frequency so that the phase meter 37 will indicate the azimuth bearing of the radiosonde, assuming of course that the commutation generator 38 also provides a reference "north" signal.

The slant range of the tracking station with respect to the radiosonde is determined by a second phase meter 42, which is also coupled to the frequency modulation detector 33. The output of the detector 33 is coupled to the phase meter 42 through a filter 41 which passes signals having a frequency of 81.94 kc. This frequency value corresponds to the first modulation frequency imposed on the carrier waves at the radiosonde and also to the frequency of the modulation at the tracking station.

For the purpose of determining the slant range at the phase meter 42, the signal provided by the detector 33 is phase compared with the modulation signal generated by the oscillator 50. A portion of the modulation envelope detected at 54 is applied to the phase meter 42 through a 81.94 kc. filter 43. It is apparent that the phase difference is an indication of the range of the tracking station to the radiosonde.

As previously stated, severe operating problems occur in tracking conventional radiosonde systems. Primarily, these problems occur due to the inherent simplicity of the radiosonde transmitting and receiving units which are subject to frequency drifts over wide limits. Accordingly, the system of the invention provides an arrangement, including the transmitter 3 and local oscillator 27 of the tracking station, for automatically and accurately compensating for these frequency drifts.

Referring more specifically to the tracking station transmitter 3, a portion of the output of the local oscillator 27 is applied to the mixer 44. The local oscillator 27 is always controlled to provide an output signal, having a frequency $f_3$, which differs from the frequency $f_1$ of the received radiosonde carrier waves by a fixed amount. The crystal oscillator 45 provides a signal of fixed frequency $f_4$, e.g., 29 mc., which, as shown in FIG. 2, corresponds to the difference between the frequency of the signal provided by the local oscillator 27 and the frequency $f_2$ at which the tracking station carrier wave is to be transmitted. The signals from the local oscillator 27 and the crystal oscillator 45 are mixed, and a difference frequency signal is passed by the filter 46, which corresponds to the transmitted carrier wave. If the carrier waves produced by the radiosonde oscillator 10 vary in frequency, the frequency of the local oscillator 27 output and, therefore, the frequency of the transmitter carrier wave vary a corresponding amount. For example, if the radiosonde local oscillator 10 drifts to a frequency of 405 mc., the frequency of local oscillator 27 is automatically altered to 435 mc., so that the output of mixer 23 is 30 mc. The output from mixer 44 however is now 406 mc. which is modulated and retransmitted to the radiosonde. The 406 mc. carrier is mixed with oscillations of 405 mc. (shifted frequency) so that the I-F is one mc. As a result of these interrelationships, the tracking station always transmits a carrier wave having a frequency at which the radiosonde receiver responds, thereby compensating for any frequency drift by the radiosonde oscillator 10. This arrangement is advantageous, since it permits the use of a simple, inexpensive and expendable oscillator unit in the radiosonde.

Under some circumstances, the frequency modulation imposed upon the oscillator 10 interferes with the operation of the radiosonde receiver in its desired reception of the modulation transmitted by the antenna 53 at the tracking station. This interference ordinarily occurs if the intermediate frequency of the amplifier 14 is not precisely tuned to its nominal frequency of one megacycle. Where interference between the two modulators occurs, the described embodiment may be altered to control the modulation applied to the oscillator 10 and prevent it from conflicting with the signal received by the radiosonde receiver. For example, the range finding reference modulation generated at the oscillator 50 may be generated at one-half the frequency 81.94 kc. and transmitted to the radiosonde receiver at this half frequency. The bandwidth of the amplifier 14 is made wide enough to pass the half frequency amplitude modulation side bands but not wide enough to pass the orders of side bands of the 81.94 kc. signal. A suitable bandwidth is 120 kc. So long as the deviation ratio is kept low enough to avoid all carrier nulls from the oscillator 10, modulation interference cannot occur. The output of detector 15 of the radiosonde receiver is applied to a frequency doubler which doubles the transmitted frequency to 81.94 kc., filters it and applies it as modulation to oscillator 10. A similar frequency doubler and filter would be used to derive the range indicator phase reference that is applied to the phase meter 42.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A radiosonde and tracking system, comprising a tracking station having means for generating a carrier wave, means for modulating the carrier wave with a signal of predetermined frequency, means for transmitting the signal modulated carrier wave, directional coupling means having a leakage output, and feedback means including tracking station modulation detecting means coupled to receive said leakage output to develop a feedback signal therefrom, said feedback means feeding said signal to said modulating means in a phase reverse to that of said modulation to cancel the inherent distortion therein; radiosonde means for receiving the tracking station transmitted wave, and including means for detecting said modulation signal, radiosonde means for collecting meteorological information, and converting such information into data signals, a source of radiosonde carrier waves, means for modulating said radiosonde carrier waves with said modulation signal and data signals, and means for retransmitting the modulated radiosonde carrier waves to said tracking station; said tracking station further comprising means for receiving said modulated radiosonde carrier waves, and means coupled to said last mentioned means for tracking said radiosonde.

2. The system according to claim 1, wherein said radiosonde source of carrier waves and the tracking station transmitted carrier wave are frequency offset from each other; said radiosonde also comprising means having a leakage output directionally coupling said modulated radiosonde carrier waves to the retransmitting means, and the radiosonde receiving means comprising mixing means coupled to the radiosonde directional coupling means for heterodyning the received modulated tracking station carrier wave with the leakage output of the radiosonde directional coupling means to produce a difference frequency, said difference frequency corresponding to said frequency offset.

3. A radiosonde and tracking system, comprising a tracking station having means for transmitting a signal modulated carrier wave, radiosonde means for receiving the transmitted wave and including means for detecting the modulation signal, a source of radiosonde carrier waves having a given frequency, means for modulating said carrier waves with said modulation signal, means for retransmitting the modulated radiosonde carrier waves to said tracking station and means having a leakage output for directionally coupling said carrier waves to said retransmitting means, said radiosonde means for receiving the transmitting wave also comprising mixing means coupled to the directional coupling means for heterodyning the directional coupler leakage output with the received wave to produce a signal having a difference frequency, the radiosonde detecting means being responsive to the difference frequency signal, said tracking station comprising means for receiving said modulated radiosonde carrier waves, local oscillator means for producing a wave having a frequency offset from the frequency of said radiosonde carrier waves by a fixed amount, means for demodulating said radiosonde carrier waves and means coupled to said demodulating means for tracking said radiosonde, the tracking station transmitting means comprising signal generator means for producing a wave having a predetermined frequency, mixing means coupled to the outputs of said signal generator and local oscillator means for heterodyning said signals to produce a difference frequency wave dependent on the frequency of said radiosonde carrier waves for use as said tracking station carrier wave.

4. A radiosonde and tracking system, comprising a tracking station having means for transmitting a signal modulated carrier wave; radiosonde means for receiving the transmitted wave, and including means for detecting the modulation signal, a source of radiosonde metering information, a source of radiosonde carrier waves, means for modulating said carrier waves with said modulation signal and said radiosonde metering information, and means for retransmitting the modulated radiosonde carrier waves to said tracking station; said tracking station comprising means for receiving said modulated radiosonde carrier waves, means for demodulating said radiosonde carrier waves to provide said metering information, and means for tracking said radiosonde characterized by range and azimuth determining means, said tracking system receiving means including frequency modulation detecting means for demodulating said modulated radiosonde carrier waves, means including a local oscillator for tuning said tracking system receiving means to the frequency of said radiosonde carrier waves, and automatic frequency control means coupled between the output of said frequency modulation detecting means and said oscillator; said range determining means comprising means coupled to said demodulating means for separating said modulation signal from the received radiosonde carrier waves, phase comparing means coupled to the output of the separating means, means for applying a portion of said modulation signal to said phase comparing means, whereby the phase relationship between the transmitted modulation signal and received modulation signal is an indication of the range between said tracking station and said radiosonde; said azimuth determining means comprising means coupled to said demodulating means for determining the direction of said radiosonde relative to said tracking station, and means coupled to said direction determining means to enable said last mentioned means to also indicate the azimuth of said radiosonde.

5. A radiosonde and tracking system, comprising a tracking station having means for transmitting a signal modulated carrier wave; radiosonde means for receiving the transmitted wave, and including means for detecting the modulation signal, a source of radiosonde metering information, a source of radiosonde carrier waves, means for modulating said carrier waves with said modulation signal and said radiosonde metering information, and means for retransmitting the modulated radiosonde carrier waves to said tracking station; said tracking station comprising means for receiving said modulated radiosonde carrier waves to provide said metering information, and means for tracking said radiosonde characterized by range and azimuth determining means, said tracking system receiving means including frequency modulation detecting means for demodulating said modulated radiosonde carrier waves, means including a local oscillator for tuning said tracking system receiving means to the frequency of said radiosonde carrier waves, and automatic frequency control means coupled between the output of said frequency modulation detecting means and said oscillator; said automatic frequency control means including a resistor connected to the output of said frequency modulation detecting means, a capacitor connected to said resistor and ground, and a reactance diode connected to said resistor and capacitor and to said oscillator; said range determining means comprising, means coupled to said demodulation means for separating said modulation signal from the received radiosonde carrier waves, phase comparing means coupled to the output of the separating means, means for applying a portion of said modulation signal to said phase comparing means, whereby the phase relationship between the transmitted modulation signal and received modulation signal is an indication of the range between said tracking station and said radiosonde; said azimuth determining means comprising means coupled to said demodulating means for determining the direction of said radiosonde relative to said tracking station, and means coupled to said direction determining means to enable said last mentioned means to also indicate the azimuth of said radiosonde.

6. A radiosonde and tracking system, comprising a tracking station having means for transmitting a signal modulated carrier wave; radiosonde means for receiving the transmitted wave, and including means for detecting the modulation signal, a source of radiosonde metering information, a source of radiosonde carrier waves, means for modulating said carrier waves with said modulation signal and said radiosonde metering information, and means for retransmitting the modulated radiosonde carrier waves to said tracking station; said tracking station comprising means for receiving said modulated radiosonde carrier waves, means for demodulating said radiosonde carrier waves to provide said metering information, and means for tracking said radiosonde characterized by range and azimuth determining means, said range determining means comprising, means coupled to said demodulating means for separating said modulation signal from the received radiosonde carrier waves, phase comparing means coupled to the output of the separating means, means for applying a portion of said modulation signal to said phase comparing means, whereby the phase relationship between the transmitted modulation signal and received modulation signal is an indication of the range between said tracking station and said radiosonde; said azimuth determining means comprising means coupled to said demodulating means for determining the direction of said radiosonde relative to said tracking station, and means coupled to said direction determining means to enable said last mentioned means to also indicate the azimuth of said radiosonde, said tracking station transmitting means including directional coupling means having a predetermined leakage for deriving an output from the coupler; and said means for applying a portion of the modulation signal from said transmitted carrier wave to said phase comparing means comprising means coupled to the leakage output of said directional coupling means for detecting said modulation signal, and filter means for passing the tracking station modulation signal to said phase comparing means.

7. A radiosonde and tracking system, comprising a tracking station having means for transmitting a signal modulated carrier wave; radiosonde means for receiving the transmitted wave, and including means for detecting the modulation signal, a source of radiosonde metering information, a source of radiosonde carrier waves, means for modulating said carrier waves with said modulation signal and said radiosonde metering information, and means for retransmitting the modulated radiosonde carrier waves to said tracking station; said tracking station comprising means for receiving said modulated radiosonde carrier waves, means for demodulating said radiosonde carrier waves to provide said metering information, and means for tracking said radiosonde characterized by range and azimuth determining means, said range determining means comprising, means coupled to said demodulating means for separating said modulation signal from the received radiosonde carrier waves, phase comparing means coupled to the output of the separating means, means for applying a portion of said modulation signal to said phase comparing means, whereby the phase relationship between the transmitted modulation signal and received modulation signal is an indication of the range between said tracking station and said radiosonde; said azimuth determining means comprising means coupled to said demodulating means for determining the direction of said radiosonde relative to said tracking station, and means coupled to said direction determining means to enable said last mentioned means to also indicate the azimuth of said radiosonde; said tracking station transmitting means comprising means for generating a carrier wave, means for modulating the tracking station carrier wave, means for transmitting the signal modulated carrier wave, directional coupling means having a predetermined leakage for deriving an output from the coupler, and feedback means; and said feedback means including tracking station modulation detecting means coupled to the leakage output of the directional coupling means for applying to the modulating means detected modulation in a phase inverse to the phase of the modulation to cancel any inherent distortion in the modulation.

References Cited by the Examiner
UNITED STATES PATENTS

| 2,910,683 | 10/59 | Todd | 343—7.6 |
| 2,993,181 | 7/61 | Friedman et al. | 333—10 |
| 3,025,522 | 3/62 | Steiner | 343—113.2 |
| 3,047,864 | 7/62 | Byatt | 343—113.2 |
| 3,095,564 | 6/63 | Cartwright | 343—6.5 X |

CHESTER L. JUSTUS, *Primary Examiner.*